United States Patent [19]

Hirano

[11] Patent Number: 5,152,028
[45] Date of Patent: Oct. 6, 1992

[54] UPRIGHT VACUUM CLEANER

[75] Inventor: Akihiro Hirano, Yokaichi, Japan

[73] Assignee: Matsushita Electric Industrial Co., Ltd., Osaka, Japan

[21] Appl. No.: 624,431

[22] Filed: Dec. 7, 1990

[30] Foreign Application Priority Data

Dec. 15, 1989 [JP] Japan ................... 1-326354

[51] Int. Cl.⁵ .................................. A47L 9/00
[52] U.S. Cl. .................................... 15/319
[58] Field of Search ................ 15/319, 339, 412

[56] References Cited

U.S. PATENT DOCUMENTS

| | | | |
|---|---|---|---|
| 4,099,291 | 7/1978 | Bowerman | 15/390 |
| 4,601,082 | 7/1986 | Kurz | 15/319 |
| 4,680,827 | 7/1987 | Hummel | 15/319 |
| 4,937,912 | 7/1990 | Kurz | 15/339 |
| 4,942,640 | 7/1990 | Hayashi et al. | 15/412 X |

FOREIGN PATENT DOCUMENTS 0371632 6/1990 European Pat. Off.
2063659 6/1981 United Kingdom.

*Primary Examiner*—Chris K. Moore
*Attorney, Agent, or Firm*—Panitch, Schwarze, Jacobs & Nadel

[57] ABSTRACT

An upright vacuum cleaner which includes a housing for accommodating a power-driven fan and a dust chamber, a suction head having a rotary brush for agitating dust on floors, the suction head being connected to the housing so as to enable the extracted dust to enter the dust chamber, a belt for transmitting the rotation of the fan to the rotary brush, a dust detecting sensor, and a control circuit for controlling the rotation of the fan.

5 Claims, 6 Drawing Sheets

UPRIGHT VACUUM CLEANER

BACKGROUND OF THE INVENTION

1. Field of the Invention

The present invention relates to an upright vacuum cleaner that controls an input to a power-driven fan by detecting the quantity of dust and dirt (hereinafter the dust and dirt will be referred to as dust) passing through an air path. In general, areas to be vacuumed by a vacuum cleaner include a bare floor, a carpeted floor, stairs, walls and ceilings, and in this specification they will hereinafter be referred to as "floor".

2. Description of the Prior Art

There is known a canister vacuum cleaner that controls an input to the fan, but no upright vacuum cleaner having such a capability is known.

Referring to FIGS. 4 to 6, the known canister vacuum cleaner will be described so as to explain the background of the present invention:

The illustrated vacuum cleaner includes a housing 1 having a built-in fan 2, a hose 3, an extension pipe 4, and a suction head 5 including a motor 6 for rotating a rotary brush 7. The extension pipe 4 is connected to the hose 3 through a coupler 8.

The coupler 8 is provided with a variable resistor 9 for controlling the rotations of the fan 2, and a switch 10 for turning on and off the motor 6. The switch 10 houses a light emitter 11 and a light receptor 12 located opposite to the light emitter 11. The housing 1 houses a phase control circuit 13, and a bilateral thyristor 14 designed to control the phase of a voltage applied to the fan 2 in response to a signal from the phase control circuit 13.

The phase control circuit 13 receives a signal from a dust detecting circuit 15 in response to an input from the light receptor 12. The reference numeral 16 denotes the source of power.

This vacuum cleaner is operated as follows:

When the light receptor 12 detects dust passing through a dust passageway, the dust detecting circuit 15 sends a signal to the phase control circuit 13, and a stepped-up voltage is applied to the fan 2 through the thyristor 14 so as to increase the number of rotations of the fan 2 automatically. After the dust passes through the dust passageway, the rotations are reduced. By operating the variable resistor 9, the number of rotations of the fan 2 can be increased or reduced.

When a carpeted floor is being vacuumed, the rotary brush 7 is rotated by turning on the switch 10 to operate the motor 6.

Under the known system described above, the number of rotations of the fan 2 can be adjusted either by operating the variable resistor 9 or by receiving a signal from the dust detecting circuit 15. Whereas the motor 6 is energized or deenergized by turning on or off the switch 10 that does not change the number of rotations of the motor 6. For example, when the fan 2 rotates at a relatively small number of rotations (i.e. R.P.M.), the motor 6 rotates at a constant velocity, thereby causing the suction head 5 to make a noise irrespective of the relatively silent housing 1. In addition so long as the motor 6 is in operation the rotary brush 7 continues to rotate on the carpet even if the carpet has no dust to be cleaned off. As a result, the rotary brush 7 causes wear to the carpet.

To solve this problem, there has been a proposal for controlling the rotation of the motor 6 and the fan 2 together, but this system becomes mechanically complicated with an increased number of components, thereby resulting in an increased production cost.

A further disadvantage is that the surfaces of the light emitter 11 and the light receptor 12 are stained with the dust passing through the coupler 8, thereby reducing the detecting ability.

SUMMARY OF THE INVENTION

The upright vacuum cleaner of this invention, which overcomes the above-discussed and numerous other disadvantages and deficiencies of the prior art, comprises a housing for accommodating a power-driven fan and a dust chamber, a suction head having a rotary brush for stirring up dust on floors, the suction head being connected to the housing so as to enable the extracted dust to enter the dust chamber, means for transmitting the rotation of the fan to the rotary brush, a dust detecting means, and a control means for controlling the rotation of the fan.

In a preferred embodiment, the dust detecting means comprises a light emitter and a light receptor located at opposite sides of a dust passageway, the light receptor generating a signal in response to the detection of dust.

In another embodiment, the dust detecting means is located on the side of the suction head in the dust passageway.

In a further embodiment, a cleaning member capable of contacting the light emitter and the light receptor is additionally provided so as to make them clean.

In a preferred embodiment, the cleaning member makes the light emitter and the light receptor clean by the rubbing occurring in accordance with the sliding movement of the cleaning member.

In a preferred embodiment, the degree of the sliding movement of the cleaning member depends on the angle between the housing and the suction head.

In a further embodiment, the cleaning member keeps in full contact with the light emitter and the light receptor when the angle between the housing and the suction head is 90°.

Thus, the invention described herein makes possible the objectives of (1) providing a vacuum cleaner capable of controlling the rotation of the fan in accordance with the amount of extracted dust, and (2) providing a vacuum cleaner capable of saving energy by reducing the voltage applied to the fan when no dust is present on the floor.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
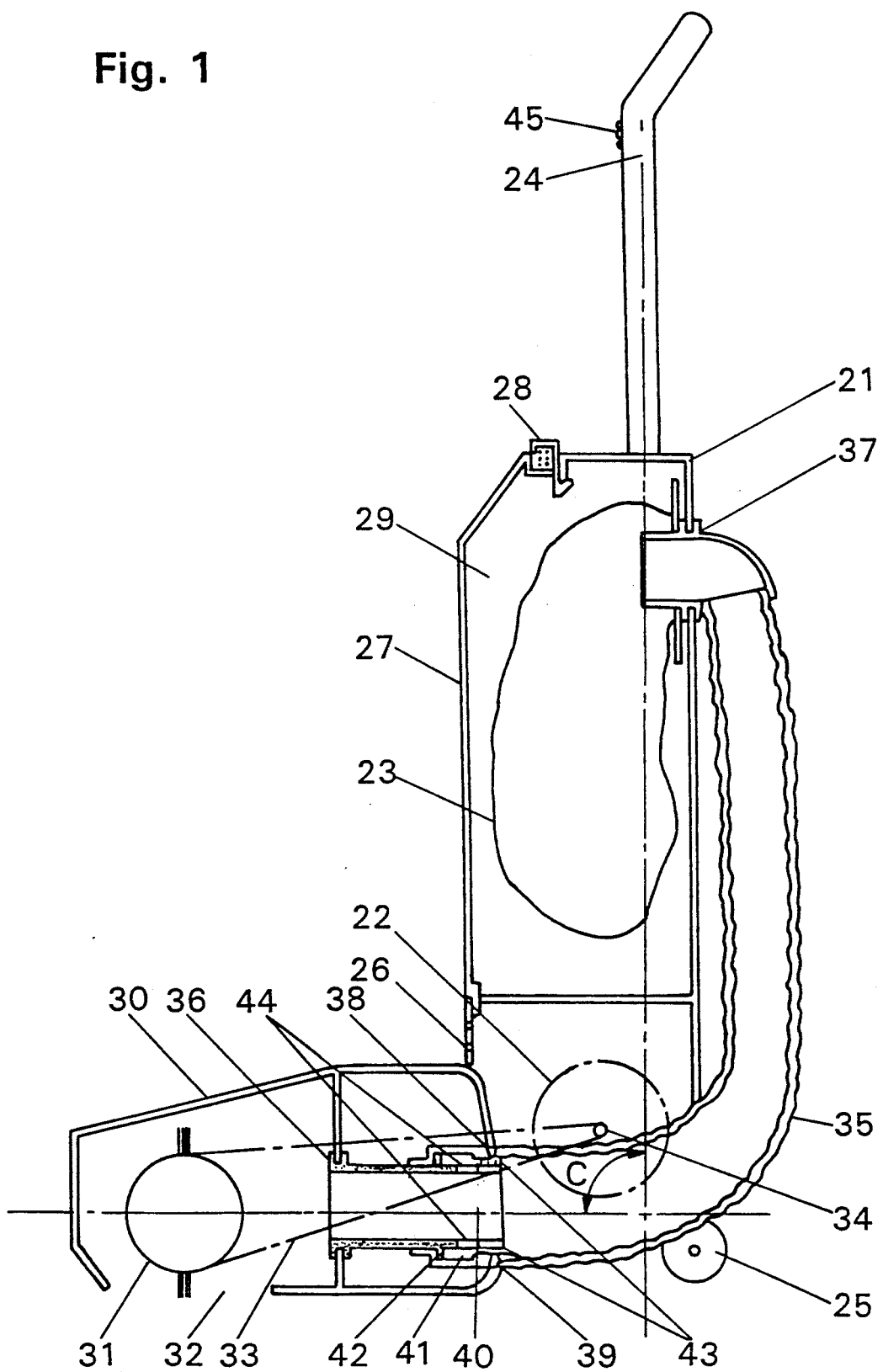
FIG. 1 is a cross-sectional view showing an upright vacuum cleaner according to the present invention.
Figure 2:
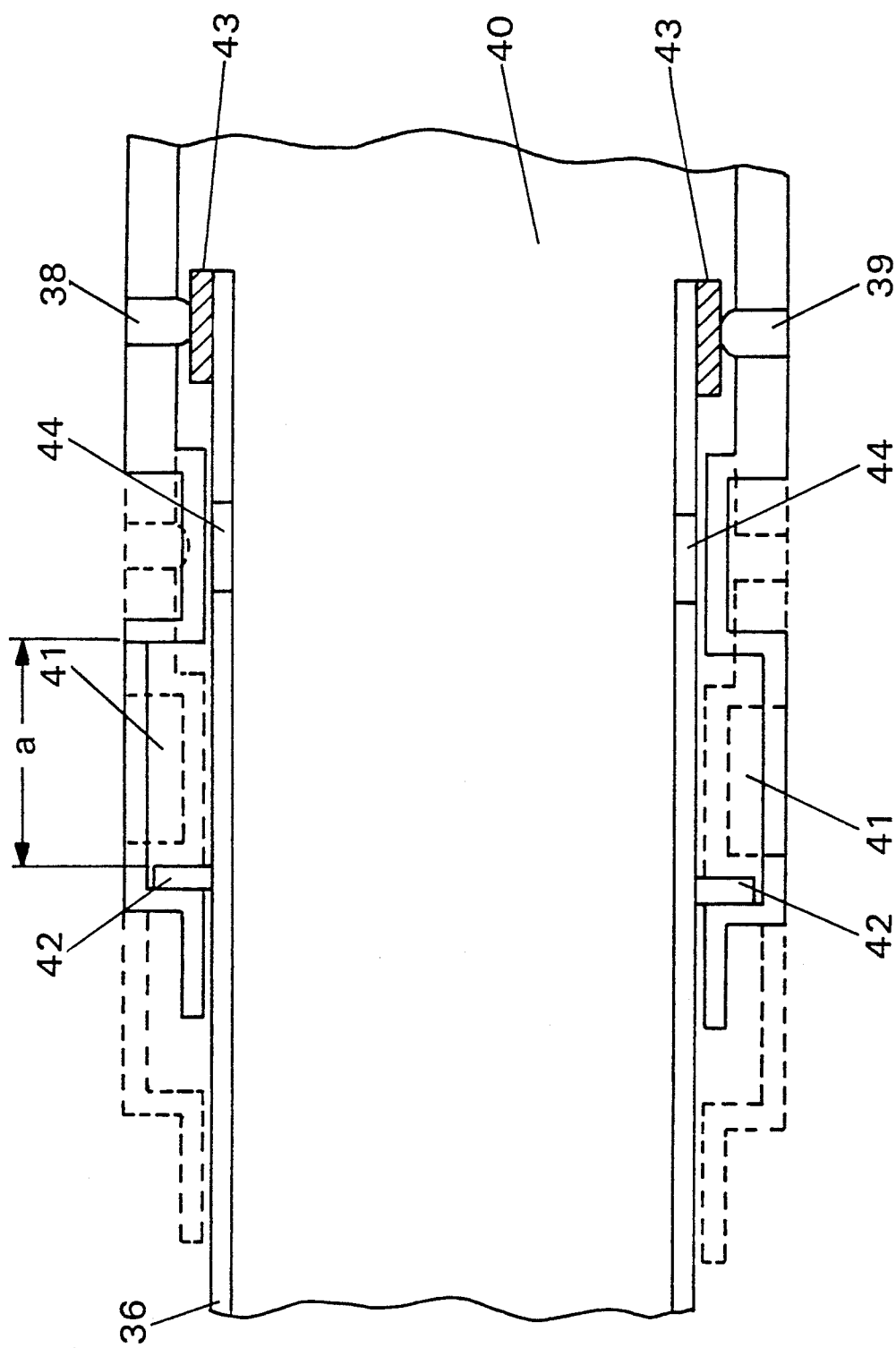
FIG. 2 is a cross-sectional view showing a portion of the vacuum cleaner shown in FIG. 1.
Figure 3:
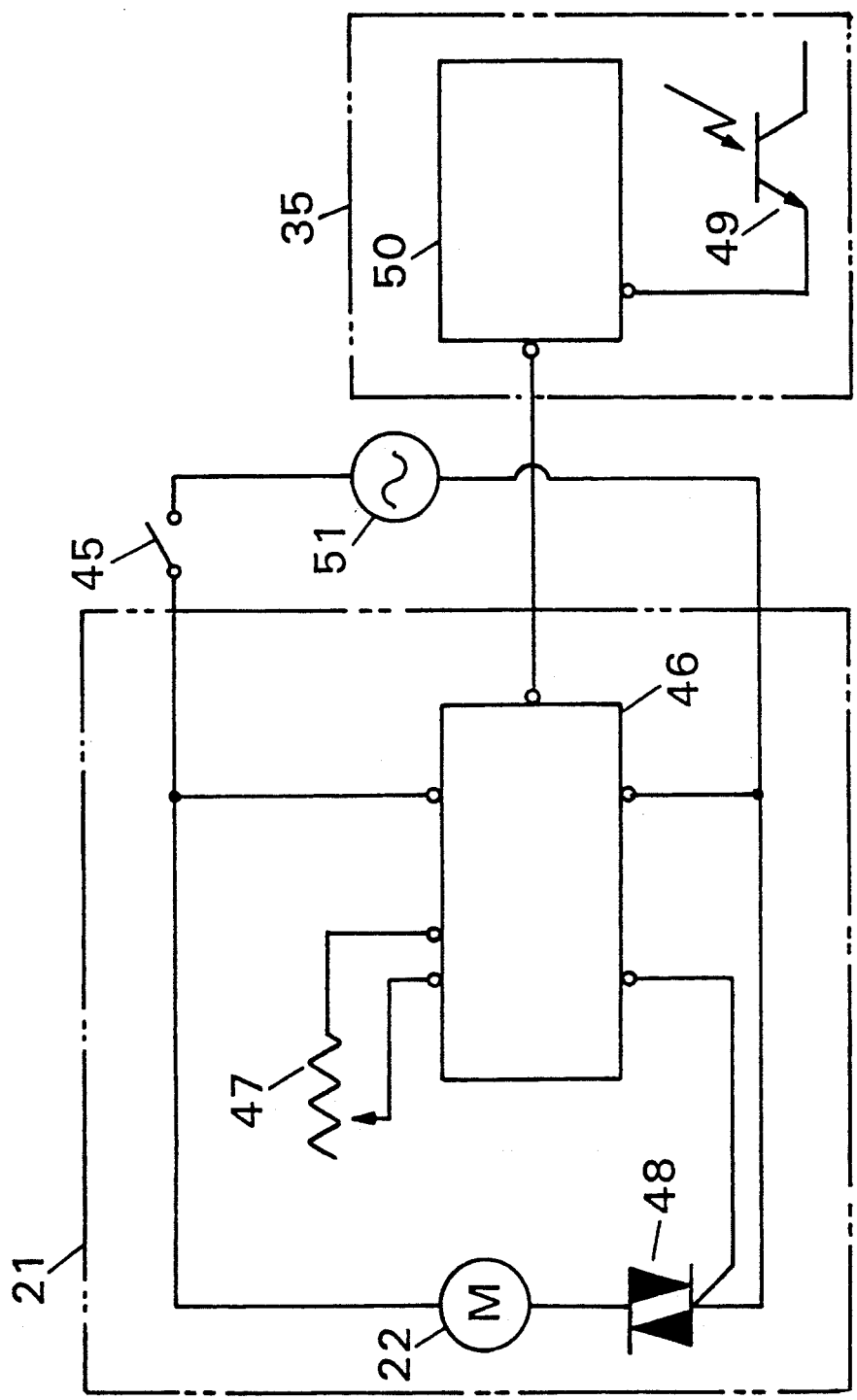
FIG. 3 is a circuit diagram incorporated in the vacuum cleaner shown in FIG. 1.
Figure 4:
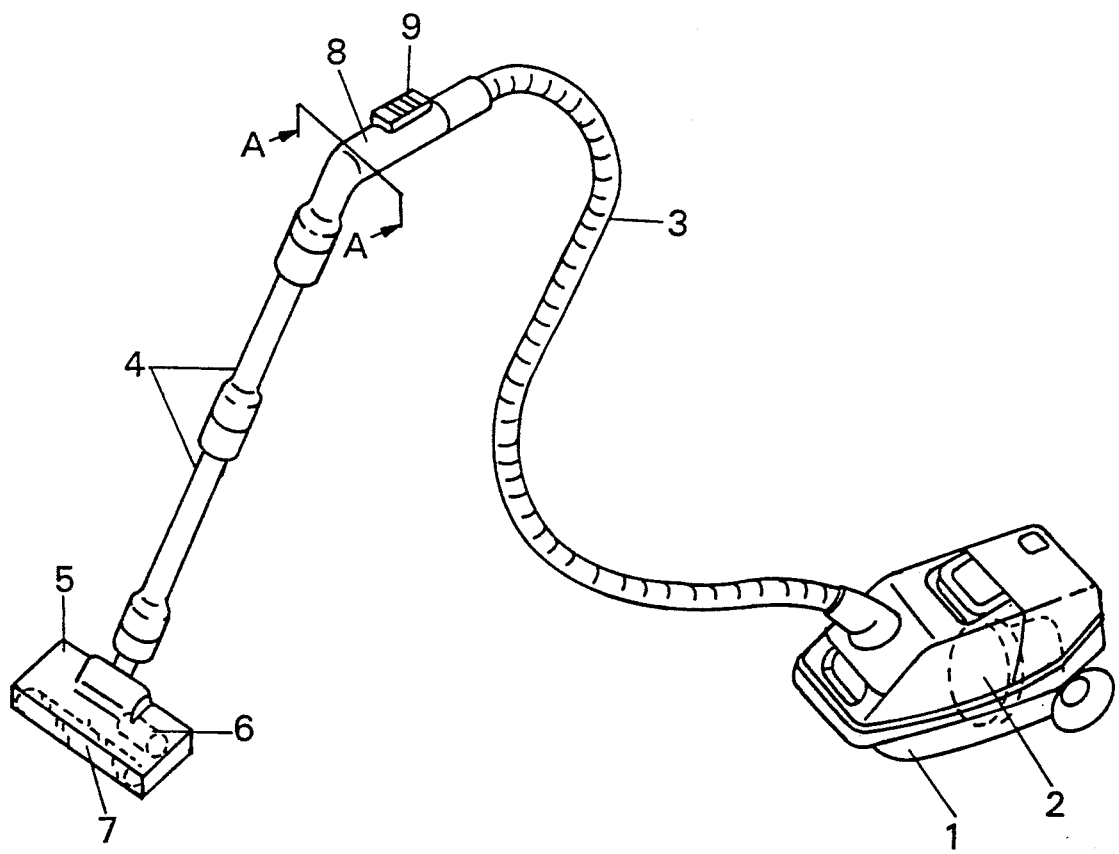
FIG. 4 is a perspective view showing a known canister vacuum cleaner.
Figure 5:
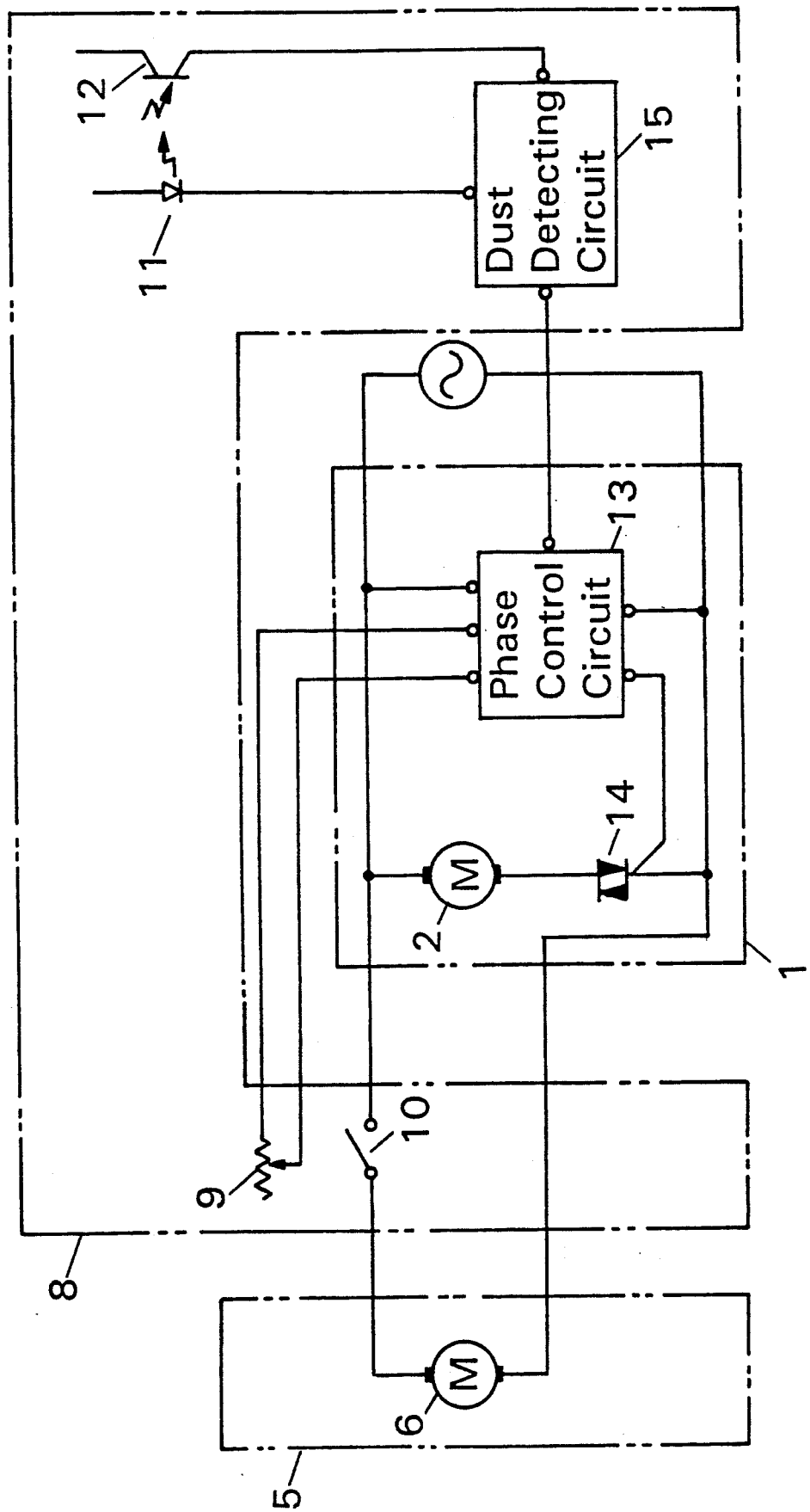
FIG. 5 is a circuit diagram incorporated in the vacuum cleaner shown in FIG. 4.

Referring to FIGS. 1 to 3, the illustrated upright vacuum cleaner includes a housing 21 for accommodating a fan 22, a dust bag 23 and other components. The housing 21 is provided with wheels 25 and a handle 24 having a manual operating switch 45. The reference numeral 26 denotes an exhaust port. The housing 21 is covered by a cover 27 which is detachably fixed to the housing 21. The interior of the housing 21 provides a dust chamber 29.

The vacuum cleaner includes a suction head 30 rotatably fixed to the housing 21, the suction head 30 accommodating a rotary brush 31 for agitating dust on the floor. The reference numeral 32 denotes a suction opening located immediately behind the rotary brush. The motion of a shaft 34 of the fan 22 is transmitted to the rotary brush 31 by means of a belt 33.

The suction head 30 is connected to the dust chamber 29 by means of a hose 35. Dust in an area to be vacuumed is agitated by the rotary brush 31, and sucked into the dust bag 23 under the back pressure of the fan 22 through an auxiliary pipe 36 partly inserted into the hose 35. The hose 35 is connected to the dust bag 23 by means of a short pipe 37.

The auxiliary pipe 36 has a dust passageway 40. A light emitter 38 and a light receptor 39 are disposed in face-to-face positions on opposite sides of the dust passageway 40.

A ring-shaped space 41 is provided having a width a between the auxiliary pipe 36 and the hose 35 at a position ahead of the light emitter 38 and the light receptor 39. The auxiliary pipe 36 includes a ring-shaped rib 42 in a region thereof that is inserted into the hose 35. The ring-shaped rib 42 is free in the ring-shaped space 41 so as to move in the width a, thereby effecting the relative movement of the hose 35 and the auxiliary pipe 36. In FIG. 2, the reference numeral 43 denotes a urethane ring. The light emitter 38 and the light receptor 39 either come into contact or out of contact with the urethane ring 43 in accordance with the movement of the auxiliary pipe 36 or the hose 35. When the auxiliary pipe 36 takes the position indicated by the full lines, the light emitter 38 and the light receptor 39 are kept in contact with the urethane ring 43. When the auxiliary pipe 36 takes the position indicated by the dotted lines, the light emitter 38 and the light receptor 39 are kept out of contact with the urethane ring 43.

The auxiliary pipe 36 is provided with apertures 44 situated between the urethane ring 43 and the rib 42. The apertures 44, when they are aligned with the light emitter 38 and the light receptor 39, enable light from the light emitter 38 to reach the light receptor 39. To this end, it is preferable that they have a larger diameter than those of the light emitter 38 and the light receptor 39.

Figure 6:
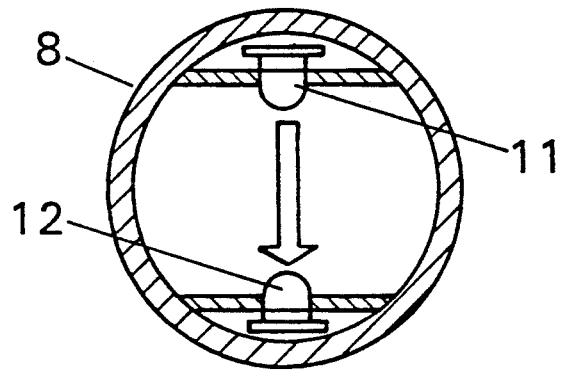
FIG. 6 is a cross-section taken along the line A—A in FIG. 4.

Referring to FIG. 6, the circuit diagram will be described:

The switch 45 turns on or off the fan 22. The phase control circuit 46 controls the phase of a voltage applied to the fan 22 through the thyristor 48 in response to a signal from the variable resistor 47. A phototransistor 49 is provided to detect the passage of dust through the hose 35, and sends a signal to a dust detecting circuit 50 that receives a signal from the phototransistor 49 and sends a signal to the phase control circuit 46. In response to the signal, the phase control circuit 46 controls the phase of a voltage that is applied to the fan 22 through the thyristor 48. The reference numeral 51 denotes the source of power.

An example of the operation of the vacuum cleaner will be described:

The switch 45 is turned on so as to energize the fan 22. Dust on the floor is sucked through the suction opening 32 under the back pressure of the fan 22. The motion of the fan 22 is transmitted to the rotary brush 31 so as to agitate dust on the floor to enable it to be collected efficiently.

When the dust passageway 40 is filled with dust passing therethrough, the light from the light emitter 38 is blocked by the dust and cannot reach the light receptor 39. This blocking is detected by the dust detecting circuit 50, and generates a signal that is sent to the phase control circuit 46. In this way the voltage applied to the fan 22 through the thyristor 48 is subjected to a phase control so as to step up the drive to the fan 22 until the power is raised to a state where no dust is present in the dust passageway 40.

When no more dust passes through the passageway 40, the dust detecting circuit 50 detects no dust being present in the dust passageway 40, and sends a signal to the phase control circuit 46. In this way the fan 22 is stepped down so as to reduce the sucking power.

In this way the sucking power of the fan 22 is increased or decreased depending upon whether dust is present or not on the floor. In accordance with the stepping-up or down of the fan 22, the rotary brush 31 is also stepped up or down.

The stains on the light emitter 38 and the light receptor 39 are cleaned in the following manner:

In vacuuming a floor, the suction head 30 is pushed and pulled along the floor by an operator. When the suction head 30 is pushed out at the farthest distance, the angle C ($90° \leq C \leq 180°$) between the housing 21 and the suction head 30 becomes largest, whereas, when the suction head 30 is nearest to the operator, the angle C becomes smallest.

One of the features of the vacuum cleaner according to the present invention is the feasibility of the relative movement of the hose 35 and the auxiliary pipe 36, that is, the hose 35 and the suction head 30. Referring to FIG. 2, the angle C between the housing 21 and the suction head 30 becomes large in the state indicated by the dotted lines. The angle C becomes 90° in the state indicated by the full lines substantially as shown in FIG. 1. In order to vacuum a floor completely, the hose 35 on the auxiliary pipe 36 is reciprocally moved forward and backward in the range a. The ring-shaped rib 42 stops the auxiliary pipe 36 from being disengaged from the hose 35.

When the hose 35 is pushed until it takes the position indicated by the dotted lines in FIG. 2, the light emitter 38, the apertures 44 and the light receptor 39 are aligned, thereby enabling the detection of the dust in the dust passageway 40. When the suction head 30 is pushed to its farthest distance from the operator, the dust is extracted most efficiently. In accordance with the reciprocal movement of the auxiliary pipe 36 the urethane ring 43 rubs the light emitter 38 and the light receptor 39, thereby removing dirt from them.

The suction head 30 is, when necessary, replaced by an attachment (not shown) which is attached to the hose 35 having a light emitter 38 and a light receptor 39. When the attachment is inserted into the hose 35, the dust detection is effected by the light emitter 38 and the light receptor 39 in the same manner as when the suction head 30 is used, thereby ensuring that the sucking power is increased and decreased in accordance with the quantity of dust passing through the dust passageway 40.

As is evident from the foregoing, the following advantages result:

1. When no substantial dust is present on a floor, the sucking power and the rotary brush 31 are stepped down, thereby saving energy and reducing noise. In addition, the floors are protected from extra wear and tear by excessive rubbing by the rotary brush.

2. When the floors are covered with a lot of dust, the fan and the rotary brush are accordingly stepped up so as to extract the dust efficiently, thereby shortening the time required for vacuuming the floors.

3. Because of the short distance between the dust detecting means and the floor, the dust in areas to be vacuumed is detected quickly and completely.

4. The vacuum cleaner is prevented from detecting the dust present in the dust chamber, but it is ensured that the dust passing through the dust passageway is detected.

5. Without cleaning the light emitter and the light receptor deliberately, the cleaning is carried out automatically.

6. The detecting of dust can be stopped by adjusting the angle between the housing and the suction head to 90° where the light from the light emitter is blocked against the light receptor.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An upright vacuum cleaner comprising a housing for accommodating a power-driven fan and a dust chamber, a suction head having a rotary brush for agitating dust on floors, the suction head being connected to the housing so as to enable the extracted dust to enter the dust chamber, means for transmitting the rotation of the fan to the rotary brush, dust detecting means for generating a signal in response to the detection of dust entering the dust chamber, control means for receiving the signal from the dust detecting means and controlling the rotation of the fan in response to the signal, and a cleaning member slidably mounted in said suction head so that said member is capable of coming into contact with the dust detecting means such that the dust detecting means is cleaned by rubbing contact with said member occurring in accordance with said sliding movement of the cleaning member.

2. A vacuum cleaner according to claim 1, wherein the dust detecting means comprises a light emitter and a light receptor located at opposite sides of a dust passageway.

3. A vacuum cleaner according to claim 1, wherein the dust detecting means is located on the side of the suction head in the dust passageway.

4. A vacuum cleaner according to claim 1, wherein the degree of the sliding movement of the cleaning member depends on the magnitude of the change of the angle between the housing and the suction head.

5. A vacuum cleaner according to claim 4, wherein the cleaning member keeps in full contact with the light emitter and the light receptor when the angle between the housing and the suction head is 90°.

* * * * *